W. V. TURNER.
LOAD BRAKE APPARATUS.
APPLICATION FILED MAY 17, 1917.
1,297,513.
Patented Mar. 18, 1919.
3 SHEETS—SHEET 1.
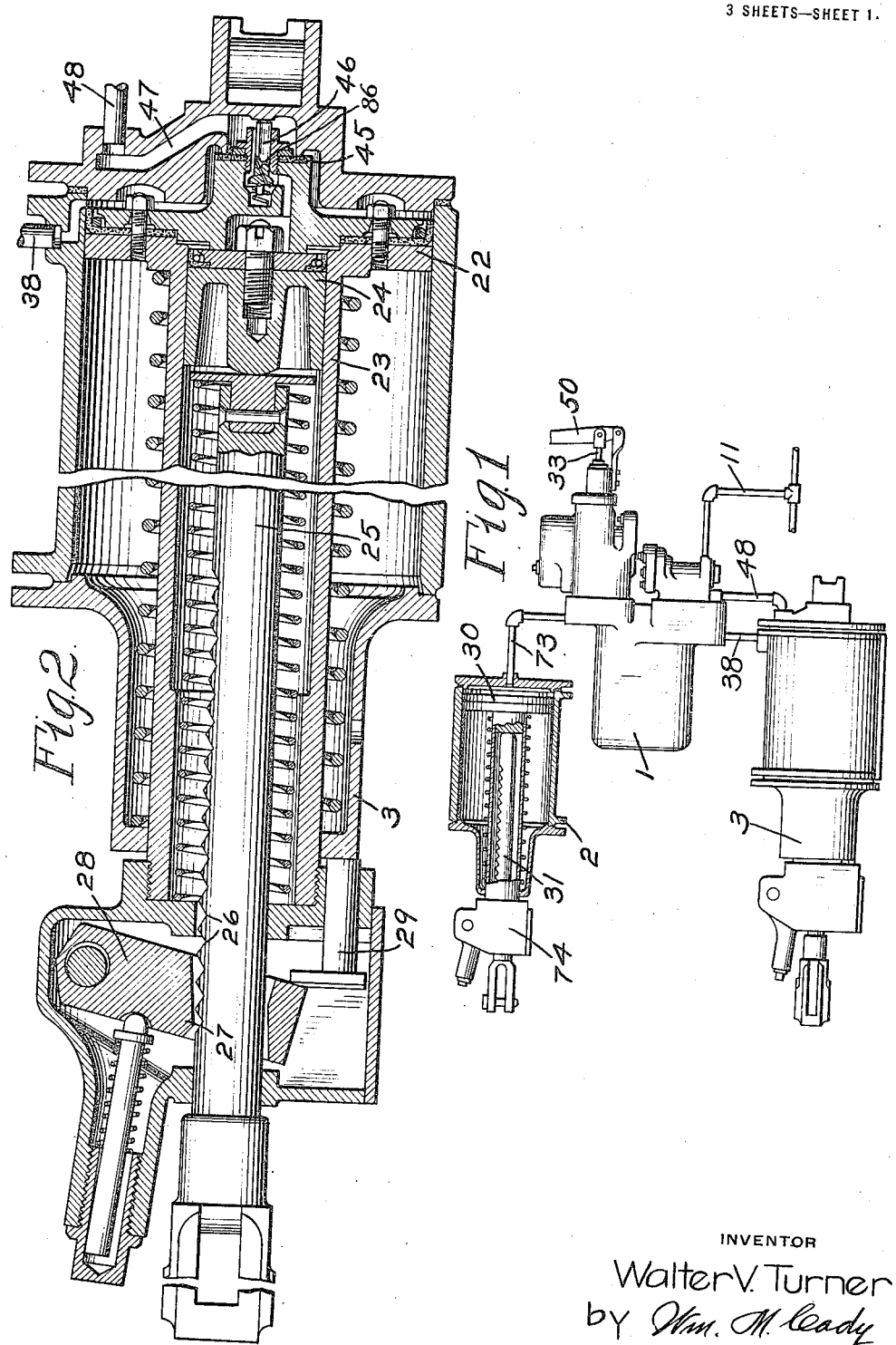
INVENTOR
Walter V. Turner
by Wm. M. Cady
Att'y.

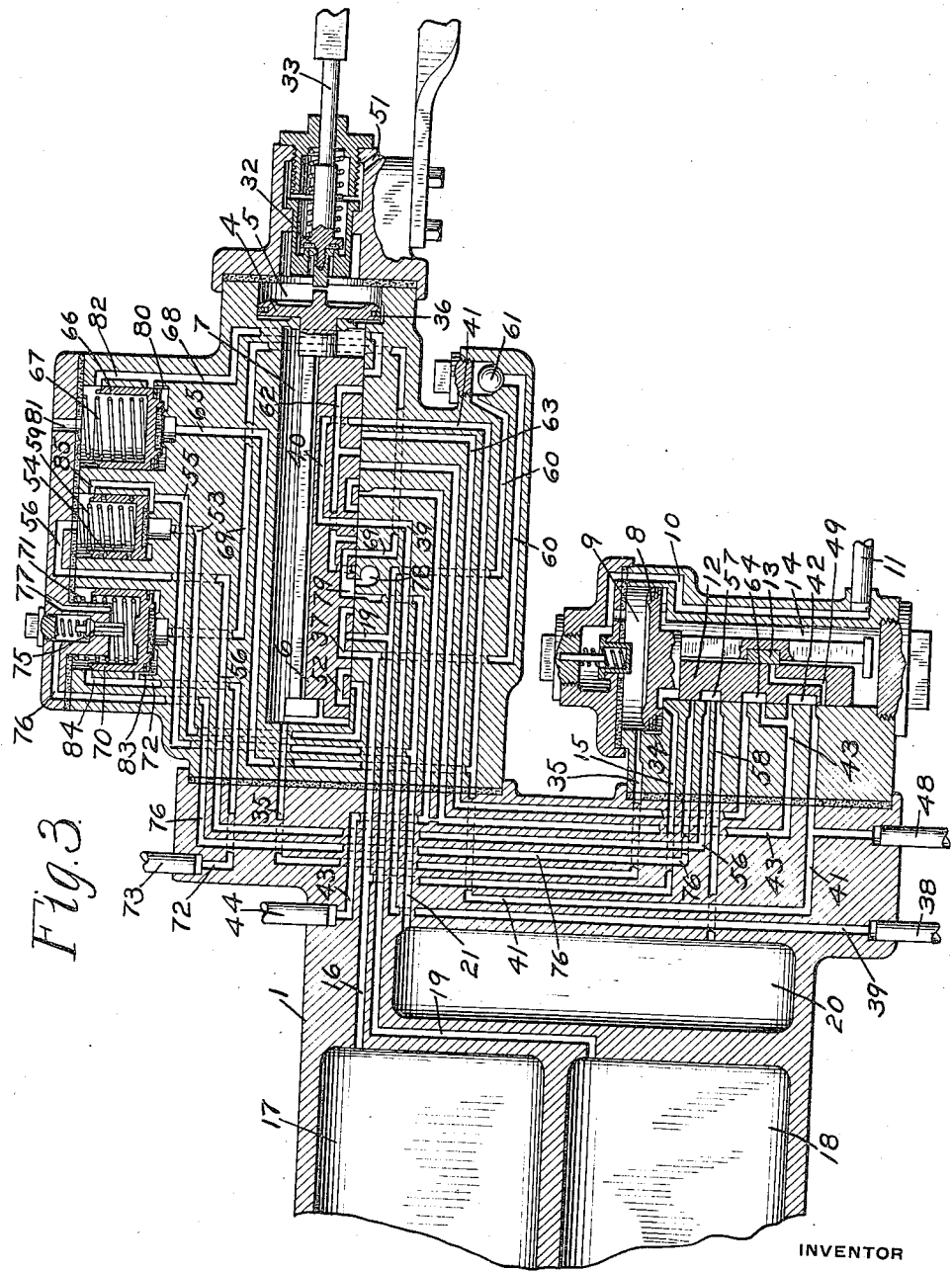

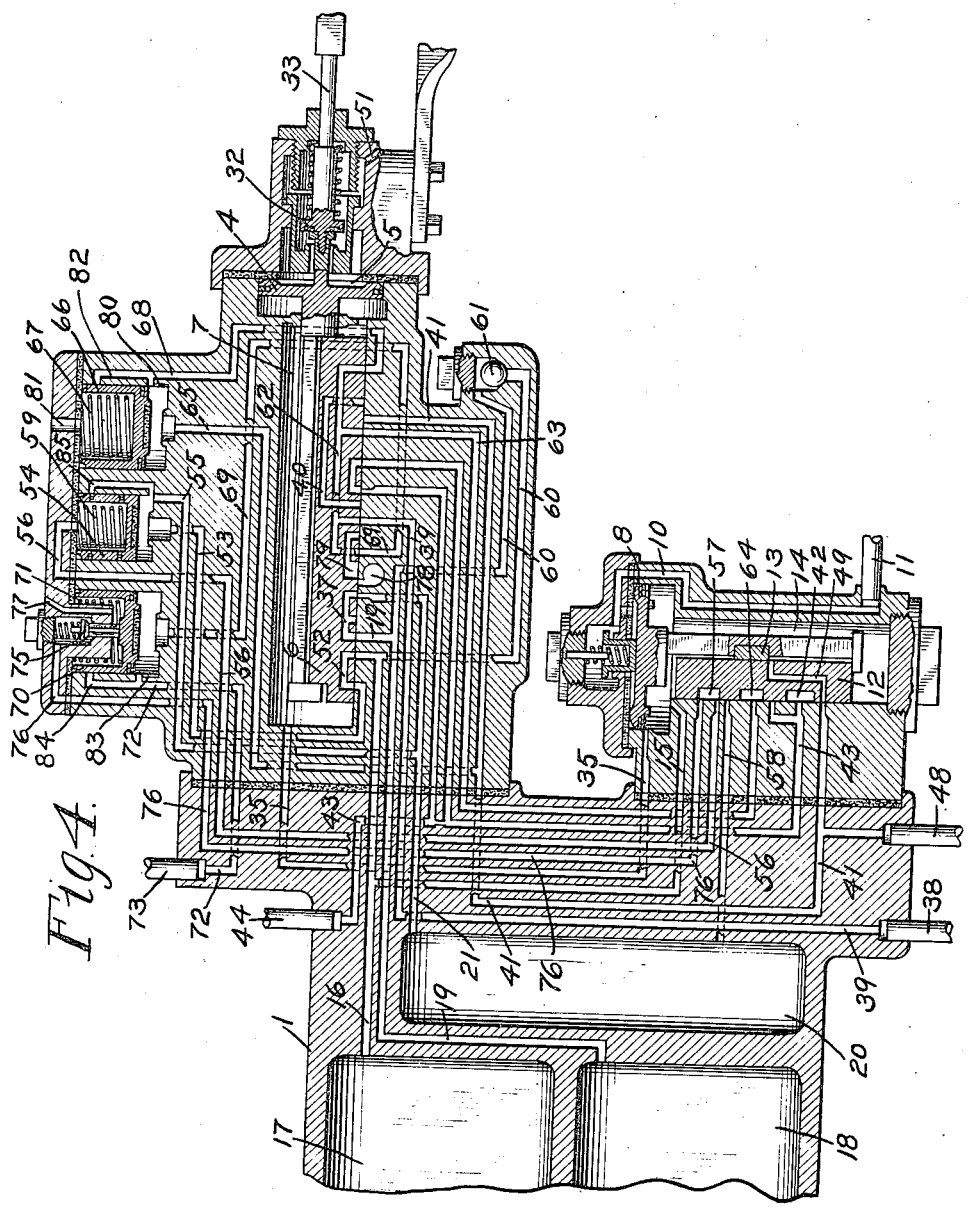

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOAD BRAKE APPARATUS.

1,297,513.      Specification of Letters Patent.      Patented Mar. 18, 1919.

Application filed May 17, 1917. Serial No. 169,208.

*To all whom it may concern:*

Be it known that I, WALTER V. TURNER, a citizen of the United States, residing at Wilkinsburg, in the county of Allegheny and State of Pennsylvania, have invented new and useful Improvements in Load Brake Apparatus, of which the following is a specification.

This invention relates to fluid pressure brakes, and more particularly to a brake apparatus adapted to be adjusted for empty and loaded car braking.

It has heretofore been proposed to provide an empty and load brake apparatus in which an additional brake cylinder and an additional reservoir volume is provided for obtaining a braking power on the loaded cars corresponding with the braking power on the empty cars, but with the increasing weight and capacity of modern freight cars, the size of the brake cylinders and the reservoir volumes have had to be increased so that the time required to recharge the reservoir volumes throughout the train has been increased to an undesirable degree, thus delaying the movement of trains and making the safe control of the trains more difficult.

The principal object of my invention is to provide an empty and load brake equipment in which the consumption of air is reduced and consequently the time of recharging the reservoir volumes is shortened.

Other objects and advantages will appear in the following more detailed description of the invention.

In the accompanying drawings; Figure 1 is a diagrammatic view of a load brake equipment, with the load brake cylinder in section, and embodying my invention; Fig. 2 a central sectional view of the empty brake cylinder; Fig. 3 a central sectional view of the empty and load brake valve device, showing the parts in the empty position, with the brakes released; and Fig. 4 a similar view, showing the parts in load position, with the brakes applied.

As shown in Fig. 1 of the drawings, the load brake equipment may comprise an empty and load brake valve device 1, a load brake cylinder 2 and an empty brake cylinder 3.

The valve device 1 comprises a casing containing a change over valve device for adjusting the mechanism for empty or load braking and a triple valve device for controlling the application and release of the brakes.

The change over valve device comprises a piston 4 contained in piston chamber 5 and a slide valve 6 contained in valve chamber 7 and the triple valve device comprises a piston 8 contained in piston chamber 9 connected by passage 10 with brake pipe 11 and a main slide valve 12 and a graduating valve 13 contained in valve chamber 14, connected by passages 15 and 16 to chamber 17, forming part of the auxiliary reservoir volume.

Chamber 18 forms the other portion of the auxiliary reservoir volume, the reason for dividing the auxiliary reservoir volume being brought out hereinafter. The chamber 18 is connected to a passage 19 leading to the seat of slide valve 6, and in addition, there is provided a load reservoir 20, having a passage 21, leading to the seat of slide valve 6.

The empty brake cylinder 3, as shown in Fig. 2 of the drawings, contains a main brake cylinder piston 22, connected to a take-up brake cylinder 23, which contains a take-up piston 24, for operating the brake cylinder push rod 25.

When the take-up piston 24 actuates the push rod 25, it is necessary to lock the rod with respect to the main piston 22, and for this purpose, the rod 25 is provided with a series of notches 26 with which a projection 27 of a pivoted lock lever 28 is adapted to engage. In the release position of the parts, the lever 28 is held out of engagement with the push rod 25 by means of a pin 29, which engages the outer end of the brake cylinder 3 and acts against the end of lever 28.

As shown in Fig. 1 of the drawings, the load brake cylinder 2 contains a piston 30 for operating a push rod 31. In this case, a device 74 similar to that provided for the empty brake cylinder is employed for locking the push rod 31 when the same is pulled out by the preliminary action of the empty brake cylinder.

In operation, for empty cars, the manually operated valve 32 is seated by the movement of the actuating rod 33, as shown in Fig. 3, and the equipment is charged with fluid under pressure from the brake pipe 11 by flow through passage 10 to piston chamber 9 of the triple valve device. Thence fluid flows through the usual feed groove 34 to valve chamber 14 and from said chamber, through passages 15 and 16 to auxiliary reservoir chamber 17. Fluid also flows from piston chamber 9 through a passage 35 to valve chamber 7 and equalizes into piston chamber 5 through a feed groove 36 around piston 4. Fluid also flows from passage 16 through cavity 37 in slide valve 6 to passage 19, so as to charge auxiliary reservoir chamber 18 with fluid under pressure.

In the release position of the triple valve device, the empty brake cylinder is connected to the exhaust through pipe 38, passage 39, cavity 40 in slide valve 6, passage 41, cavity 42 in slide valve 12, and passage 43 which leads to an exhaust pipe 44.

The main piston 22 of the empty brake cylinder is provided with a central seat 45, which in release position is adapted to seat, as shown in Fig. 2 of the drawings. In this position, a puppet valve 46 in the piston 22 is unseated and opens communication from take-up piston 24 to a passage 47 and pipe 48 which opens to passage 41, so that the take-up piston is also connected to the exhaust.

In the empty position of the change over valve device, the load reservoir 20 is connected to an exhaust port 78 through passage 21, and cavity 79 in slide valve 6, so that possible leakage into said reservoir can escape.

A service application of the brakes may be effected in the usual manner by making a gradual reduction in brake pipe pressure, so as to cause the movement of the triple valve piston and slide valve to application position. Port 49 in slide valve 12 then registers with passage 41, so that fluid is supplied from the connected auxiliary reservoir chambers 17 and 18, through valve chamber 14, to the empty brake cylinder 3 both by way of pipe 38 and pipe 48. The main piston 22 therefore moves out with the take-up piston 24 to effect an application of the brakes in the usual way.

If the apparatus is to be adjusted for load braking, the rod 33 is pulled outwardly by the manual operation of lever 50 as shown in Fig. 1, so as to unseat the valve 32. Fluid is then vented from piston chamber 5 to exhaust port 51, and the fluid pressure in valve chamber 7 operates piston 4 so that the change over valve parts assume the positions shown in Fig. 4 of the drawings.

When the apparatus is being charged, fluid flows through the feed groove 34 to valve chamber 14 and thence through passages 15 and 16 to auxiliary reservoir chamber 17.

The auxiliary reservoir chamber 18 also is charged from passage 16 through passage 60, containing a check valve 61, and leading to passage 19, and the load reservoir 20 is also charged from passage 60 through cavity 37 in slide valve 6 and passage 21.

In release, the pipe 38 leading to the main piston of the empty brake cylinder is connected to the exhaust through passage 39, cavity 62, passage 63, cavity 64 in equalizing slide valve 12, and passage 43, while pipe 48, leading to the take-up piston 24, is connected to the exhaust through passage 41, cavity 42, and passage 43.

In order to effect a service application of the brakes, the brake pipe pressure is reduced and the equalizing piston 8 is shifted to application position, as shown in Fig. 4 of the drawings. Fluid is then supplied from the auxiliary reservoir chamber 17 through passages 16 and 15 to valve chamber 14 and thence through port 49, passage 41, and pipe 48 to the take-up piston 24, the valve 46 being held open, so long as the main piston 22 is in release position.

The piston 24 then moves out to take up brake shoe clearance and the lost motion in the brake rigging.

Fluid pressure supplied to the take-up piston also flows through passage 41 and passage 65 to the seated area of a valve piston 66 and when the take-up cylinder pressure reaches a predetermined degree, the pressure of spring 67 on the valve piston is overcome and the piston is lifted from its seat, so as to permit fluid to flow from passage 65 to a passage 68 which is connected through cavity 62 in the change over slide valve 6 with passage 39 and pipe 38. Fluid is therefore supplied from the auxiliary reservoir chamber 17 to the main piston 22 of the empty brake cylinder and as this piston moves out, the lock lever 28 is permitted to engage the notches 26 of the push rod 25, since the pin 29 can now move away from the lever 28. The push rod 25 is therefore further actuated through the movement of the main piston 22 to apply the brakes with force due to the air pressure acting on said piston.

The check valve 46 is provided for the purpose of preventing flow from the take-up cylinder to the main piston 22 when the same lifts from its seat 45, as the drop in pressure which would otherwise be produced in the take-up cylinder might permit the push rod 25 to move back before the lock lever 27 could engage with the notches 26.

The empty and load brake cylinders are so connected to the brake rigging, as shown, for example in my prior Patent No. 1,131,967, dated March 16, 1915, that the push rod 31 of the load cylinder is pulled out as the brakes are applied by the operation of the empty brake cylinder piston and upon a predetermined pressure being attained in the empty brake cylinder, the same will act, through flow from cavity 62 to a passage 69, on the exposed area of a valve piston 70 to lift same against the resistance of a spring 71 and open communication from passage 69 to passage 72 and pipe 73, which leads to the load brake cylinder 2 and the load brake cylinder piston 30 is thereupon actuated to apply the brakes with increased power, the locking device 74 operating as in the case of the empty brake cylinder, to lock the push rod 31 with respect to the piston 30. While the brake cylinder area is thus suddenly increased, the braking power is not abruptly increased because the fluid pressure is somewhat reduced by equalization from the empty brake cylinder into the load brake cylinder.

The outward movement of valve piston 70 operates to open a check valve 75, so as to vent fluid from the spring side of valve piston 54, through passage 56, cavity 57 in equalizing slide valve 12, and passage 76 to exhaust port 77.

In the load position of change over slide valve 6, the load reservoir 20 is connected to the auxiliary reservoir chamber 18 through passage 21, cavity 37 in slide valve 6, and passage 19 and when the valve piston 54 is lifted from its seat by venting fluid from the spring side thereof, communication is opened from the load reservoir 20 and the auxiliary reservoir chamber 18, to the auxiliary reservoir chamber 17 from passage 21 through passage 55, passage 53, cavity 52 in slide valve 6, and passage 16.

It will thus be seen that upon supplying fluid to the load break cylinder the auxiliary reservoir chamber 18 and the load reservoir 20 are connected to the auxiliary reservoir chamber 17, so that upon further reductions in brake pipe pressure, the triple valve device operates to supply fluid from all three reservoirs to the combined volumes of the empty and the load brake cylinders.

In order to release the brakes, the brake pipe pressure is increased, so as to effect the movement of the triple valve piston 8 to release position, in which the empty brake cylinder passage 41 is connected to exhaust pipe 44 through cavity 42 and passage 43.

The fluid in the load brake cylinder 2 is released through passage 72, past the open valve piston 70 to passage 69, and thence through cavity 62 in slide valve 6, passage 63, cavity 64 in slide valve 12, and passage 43, to the exhaust.

After the load brake cylinder pressure has reduced to a predetermined degree by exhaust through the passage 43, the valve piston 70 will move to its inner seat and any fluid remaining in the load brake cylinder will now exhaust through passage 72 to the exhaust port 77.

The movement of the equalizing valve device to release position, causes slide valve 12 to connect passage 58, through cavity 57, with passage 56, so that fluid pressure in the load reservoir 20 is supplied to the spring side of the valve piston 44 and since load reservoir pressure is acting on the opposite side thereof, the fluid pressures will be equalized, permitting the spring 59 to move the valve piston to its seat.

When the brake cylinder pressure acting on the inner face of the valve piston 66 has been reduced substantially to atmospheric pressure, said valve piston is moved to its inner seat by spring 67. In order to prevent possible leakage from opening the valve piston 66, a restricted groove 80 is provided for connecting the outer area of the valve piston with exhaust port 81, through an extension 82 of passage 68. Similarly, leakage to the outer area of valve piston 70 can escape through a restricted groove 83 and extension 84 of passage 72 to exhaust port 77.

An extension 85 of passage 55 also connects opposite sides of the valve piston 54, in its seated position, so as to normally maintain the opposing fluid pressures thereon, equalized.

It might happen, in releasing the brakes, that the main piston 22 will not move back to its full release position and if this should occur, the valve 46 may not be unseated to permit the release of fluid from the take-up brake cylinder 23.

In order to insure the exhaust of air from the take-up brake cylinder, a small port 86 may be provided through the valve 46 which will permit the exhaust of fluid from the take-up brake cylinder, even if the valve 46 remains seated.

In order to prevent possible leakage of fluid from the seat of the valve piston 70 when the parts are in empty car position, the passage 69 is connected through cavity 79 in the slide valve 6 with exhaust port 78.

Having now described my invention, what I claim as new and desire to secure by Letters Patent, is:—

1. In an empty and load brake, the combination with a brake cylinder for taking up the slack in the brake rigging and a brake cylinder for applying the brakes with force, of an additional brake cylinder for applying the brakes with greater force.

2. In an empty and load brake, the combination with a plurality of brake cylinders, of means for first supplying fluid to one brake cylinder, then to another, and finally to a third brake cylinder.

3. In an empty and load brake, the combination with a small brake cylinder for taking up the slack in the brake rigging, a second brake cylinder for applying the brakes with force, and a third brake cylinder for applying the brakes with greater force, of means for first supplying fluid to the first brake cylinder, then to the second, and finally to the third brake cylinder.

4. In an empty and load brake, the combination with a push rod, a brake cylinder piston for operating said rod to take up the slack in the brake rigging, a brake cylinder piston for applying the brakes with force, and means for connecting said brake cylinder piston with said push rod, of another push rod operated by the movement of the brake rigging, a brake cylinder piston for operating same, and means for connecting the second push rod with the last mentioned brake cylinder piston.

5. In an empty and load brake, the combination with a main brake cylinder piston, a push rod, a brake cylinder piston for operating said rod to take up slack in the brake rigging and means for locking the main piston to said rod, of another push rod movable with the brake rigging, a load brake cylinder piston and means for locking the load piston to the second push rod.

6. In an empty and load brake, the combination with two auxiliary reservoir chambers and a load reservoir, of means for supplying fluid from both chambers for empty car braking, and for loaded car braking, first from one of said chambers and then from both chambers and the load reservoir.

7. In an empty and load brake, the combination with a main brake cylinder, a take-up brake cylinder, and means operated at a predetermined pressure in the take-up brake cylinder for supplying fluid to the main brake cylinder, of a load brake cylinder and means operated at a predetermined pressure in the main brake cylinder for supplying fluid to the load brake cylinder.

8. In an empty and load brake, the combination with a reservoir, a main brake cylinder, a take-up brake cylinder, and means operated at a predetermined pressure in the take-up brake cylinder for supplying fluid from said reservoir to the main brake cylinder, of an additional reservoir, a load brake cylinder, means operated at a predetermined pressure in the main brake cylinder for supplying fluid to the load brake cylinder, and means operated upon cutting in the load brake cylinder for supplying fluid from the additional reservoir to the brake cylinders.

9. In an empty and load brake, the combination with a main brake cylinder, a load brake cylinder, and means operated at a predetermined pressure in the main brake cylinder for cutting in the load brake cylinder, of a supply reservoir, a valve device, and a valve operated by said means for varying the pressure on said valve device to operate same and thereby open communication for supplying fluid from said reservoir to the brake cylinders.

In testimony whereof I have hereunto set my hand.

WALTER V. TURNER.